(12) United States Patent
Cheng et al.

(10) Patent No.: US 8,812,831 B2
(45) Date of Patent: Aug. 19, 2014

(54) FAN CONTROL METHOD AND APPARATUS FOR ADJUSTING INITIAL FAN SPEED BASED ON A DISCRETENESS LEVEL OF INSTALLED DEVICES AND CALIBRATING FAN SPEED ACCORDING TO THRESHOLD POWER AND ADJUSTED INITIAL SPEED

(75) Inventors: Yao-Chun Cheng, Taipei (TW); Edward Y. Kung, Taipei (TW); Terrence Lee, Taipei (TW); Kuei H. Liu, Changhua (TW); Ming-Hui Pan, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 13/250,360

(22) Filed: Sep. 30, 2011

(65) Prior Publication Data

US 2012/0084551 A1 Apr. 5, 2012

(30) Foreign Application Priority Data

Sep. 30, 2010 (TW) ................................ 99133353 A

(51) Int. Cl.
*G06F 9/00* (2006.01)
*G06F 15/177* (2006.01)

(52) U.S. Cl.
USPC ........................................................... 713/2

(58) Field of Classification Search
None
See application file for complete search history.

(56) References Cited

U.S. PATENT DOCUMENTS

| | | | |
|---|---|---|---|
| 6,400,045 B1 * | 6/2002 | Hosokawa et al. | 307/117 |
| 7,139,169 B2 | 11/2006 | Alperin et al. | |
| 2004/0257013 A1 * | 12/2004 | Chhleda et al. | 318/268 |
| 2006/0016901 A1 * | 1/2006 | Beitelmal et al. | 236/49.3 |
| 2007/0109725 A1 | 5/2007 | Lindell et al. | |
| 2008/0278905 A1 * | 11/2008 | Artman et al. | 361/685 |

* cited by examiner

*Primary Examiner* — Thomas Lee
*Assistant Examiner* — Zhipeng Wang
(74) *Attorney, Agent, or Firm* — Katherine S. Brown; Jeffrey L. Streets

(57) ABSTRACT

A fan control method for an information handling system is provided. The information handling system includes a device area and a fan for providing air flow to the device area. A plurality of devices is installed on the device area. The method includes the steps of: collecting thermal data of installed devices in the device area when booting up the information handling system; determining a threshold power of the installed devices and a discreteness level of the installed devices based on the thermal data; adjusting an initial speed of the fan based on the discreteness level; and calibrating the speed of the fan to obtain an optimized speed thereof based on the threshold power and the adjusted initial speed. A fan control apparatus for an information handling system is further provided.

11 Claims, 3 Drawing Sheets

FAN CONTROL METHOD AND APPARATUS FOR ADJUSTING INITIAL FAN SPEED BASED ON A DISCRETENESS LEVEL OF INSTALLED DEVICES AND CALIBRATING FAN SPEED ACCORDING TO THRESHOLD POWER AND ADJUSTED INITIAL SPEED

CROSS-REFERENCE TO RELATED APPLICATIONS

This application claims the benefit of priority from Taiwan Patent Application 099133353, filed on Sep. 30, 2010.

BACKGROUND OF THE INVENTION

1. Field of the Invention

The present invention relates to information handling systems, and more particularly, to a fan control method and apparatus for use in an information handling system.

2. Background of the Related Art

Due to persistent improvement and development of the components employed in information handling systems, thermal management of information handling systems is increasingly complicated. Hence, it poses a challenge to effectuate efficient thermal management of information handling systems.

For example, the speed of a cooling fan in an information handling system with a plurality of devices (such as a plurality of peripheral component interconnect (PCI) compatible devices) installed is typically set to the highest speed or a relatively high speed with a view to meeting the need for various PCI compatible devices in terms of heat dissipation requirement. Although a fan thus designed and operated ensures the stability of operation of the system equipped with plenty of devices and enables heat dissipation to take place in any scenario that involves the use of an expansion slot within the system, the fan is likely to consume excess energy and thus is not energy efficient. Moreover, the noise generated by the cooling fan operating at a high speed is a significant source of noise pollution.

BRIEF SUMMARY OF THE INVENTION

In an embodiment of a computer-implemented fan control method for an information handling system according to the present invention, the information handling system includes a device area and a fan for providing air flow to the device area. The device area has a plurality of devices installed thereon. The method includes the steps of: collecting thermal data of the installed devices in the device area when booting up the information handling system; determining a threshold power of the installed devices in the device area and a discreteness level of the installed devices in the device area based on the number of installed devices compared to the number of slots in the device area; adjusting an initial speed of the fan based on the discreteness level; and calibrating or adjusting the speed of the fan to obtain an optimized speed thereof based on the adjusted initial speed and any difference between the threshold power and the actual power consumption.

In another embodiment of a computer-implemented fan control method for an information handling system according to the present invention, the information handling system includes a device area and a fan for providing air flow to the device area. The method includes the steps of: scanning a device area bus coupled to the device area when booting up the information handling system; identifying a device type and power consumption for each device installed in the device area; determining the number of the devices installed in the device area; determining a threshold power of the installed devices based on the number of the installed devices; determining a discreteness level of the devices installed in the device area; adjusting an initial speed of the fan based on the discreteness level; and calibrating the speed of the fan based on the threshold power and the adjusted initial speed to obtain an optimized speed.

In yet another embodiment of a fan control apparatus for an information handling system according to the present invention, the information handling system includes a device area and a fan for providing air flow to the device area. The device area has a plurality of devices installed thereon. The apparatus includes: a BIOS module coupled to the device area for: collecting thermal data of the devices installed in the device area when booting up the information handling system; and determining a threshold power of the installed devices and a discreteness level of the installed devices based on the thermal data; and an administrator module coupled to the fan and the BIOS module for: adjusting an initial speed of the fan based on the discreteness level; and calibrating the speed of the fan based on the threshold power and the adjusted initial speed to obtain an optimized speed.

According to a further embodiment, a computer program product in a computer readable medium is provided to perform a method as mentioned above, upon execution in an information handling system.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
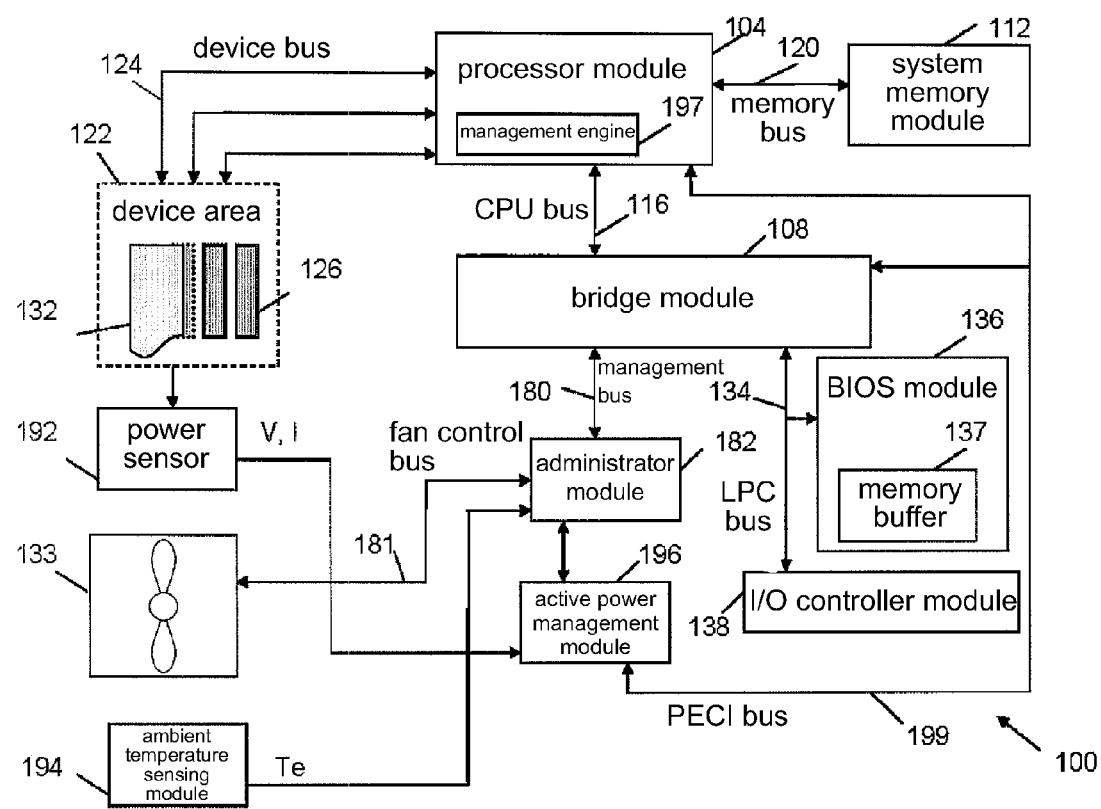
FIG. 1 is a schematic view of the structure of a system according to a specific embodiment of the present invention.

In an embodiment of a computer-implemented fan control method for an information handling system according to the present invention, the information handling system includes a device area and a fan for providing an air flow to the device area. The device area has a plurality of devices installed thereon. The method includes the steps of: collecting thermal data of the devices installed in the device area when booting up the information handling system; determining a threshold power of the installed devices and a discreteness level of the installed devices based on the thermal data; adjusting an initial speed of the fan based on the discreteness level; and calibrating the speed of the fan to obtain an optimized speed thereof based on the threshold power and the adjusted initial speed.

Collecting thermal data of the devices installed in the device area may, for example, include scanning a device area bus coupled to the device area when booting up the information handling system. The installed devices are identified to obtain a type of each of the installed devices (i.e., a device type) and a device power consumption, and determine a number of the installed devices (i.e., a device number). The thermal data includes the type of each of the installed devices, the power consumption of each device, and the device number.

The step of determining the threshold power and the discreteness level may, for example, include determining the threshold power of the installed devices based on the device number, and determining the discreteness level of the installed devices based on an installation configuration of the installed devices.

The information handling system may, for example, further include: an administrator module coupled to the fan; a processor module coupled to the device area bus; a bridge module coupled to the processor module and the administrator module; a BIOS module coupled to the bridge module; and an active power management module coupled to the administrator module.

The BIOS (Basic Input/Output System) module may include firmware stored in a nonvolatile memory chip, and the BIOS module may include BIOS code for collecting the thermal data of the installed devices, determining the threshold power of the installed devices, and determining the discreteness level of the installed devices.

The administrator module may include a baseboard management controller (BMC) for monitoring an operation of the information handling system such that the BMC may adjust the initial speed of the fan and calibrate the initial speed, and/or the active power management module includes an active power management application software for performing active management, monitoring, and control of power consumption and cooling in the information handling system.

The information handling system may, for example, further include a power sensor coupled to the active power management module. Accordingly, the active power management module may calibrate the speed of the fan by (the following sub-steps of) the active power management module receiving a real-time power signal indicating the amount of power consumed by the installed devices; the administrator module receiving the threshold power of the installed devices; the active power management module comparing the real-time power and the threshold power by; the administrator module ramping up or ramping down a speed of the fan in response to determining that the real-time power does not equal the threshold power; and repeating the above sub-steps if the real-time power equals the threshold power.

After the number of installed devices (i.e., the device number N) has been determined, the BIOS module may determine the discreteness level of the installed devices in the device area.

In one specific embodiment of the invention, the device area bus and a plurality of connector slots corresponding in position thereto are coupled to the processor module. A plurality of devices can be inserted into the plurality of connector slots, respectively. The information handling system may further include an ambient temperature sensing module for detecting a temperature of an environment (Te) for operation of the information handling system, which temperature may be used in determining an initial speed of the fan.

In another embodiment of a computer-implemented fan control method for an information handling system according to the present invention, the information handling system includes a device area and a fan for providing air flow to the device area. The method includes: scanning a device area bus coupled to the device area when booting up the information handling system; identifying devices installed in the device area to obtain a type of each of the installed devices and an amount of power consumed by each of the installed devices; determining a device number of the installed devices; determining a threshold power of the installed devices based on the device number; determining a discreteness level of the installed devices; adjusting an initial speed of the fan based on the discreteness level; and calibrating the speed of the fan based on the threshold power and the adjusted initial speed to obtain a speed that is optimized to efficiently cool the installed devices based upon their configuration and power consumption.

In yet another embodiment of a fan control apparatus for an information handling system according to the present invention, the information handling system includes a device area and a fan for providing an air flow to the device area. The device area has a plurality of devices installed thereon. The apparatus includes a BIOS module coupled to the device area for collecting thermal data of the plurality of installed devices when booting up the information handling system, and using that thermal data to determine a threshold power of the installed devices and a discreteness level of the installed devices. The apparatus further includes an administrator module coupled to the fan and the BIOS module for adjusting an initial speed of the fan based on the discreteness level, and calibrating the speed of the fan based on the threshold power and the adjusted initial speed to obtain an optimized speed.

The information handling system further includes: a processor module coupled between the device area and the BIOS module; a bridge module coupled between the processor module and the administrator module and coupled between the processor module and the BIOS module; and an active power management module coupled to the administrator module, wherein the device area bus and a plurality of connector slots corresponding in position thereto are coupled to the processor module, and a plurality of devices can be installed into the plurality of connector slots, respectively.

The information handling system further includes a power sensor coupled to the active power management module. Accordingly, the active power management module receives a signal indicating the real-time power consumed by the installed devices; the administrator module receives the threshold power of the installed devices; the active power management module compares the real-time power and the threshold power; and the administrator module calibrating (i.e., ramping up or ramping down) a speed of the fan in response to determining that the real-time power does not equal the threshold power. The above sub-steps may be repeated in response to determining that the real-time power equals the threshold power.

According to a further embodiment, a computer program product embodied on a computer readable medium is provided to perform a method as mentioned above, upon execution in an information handling system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
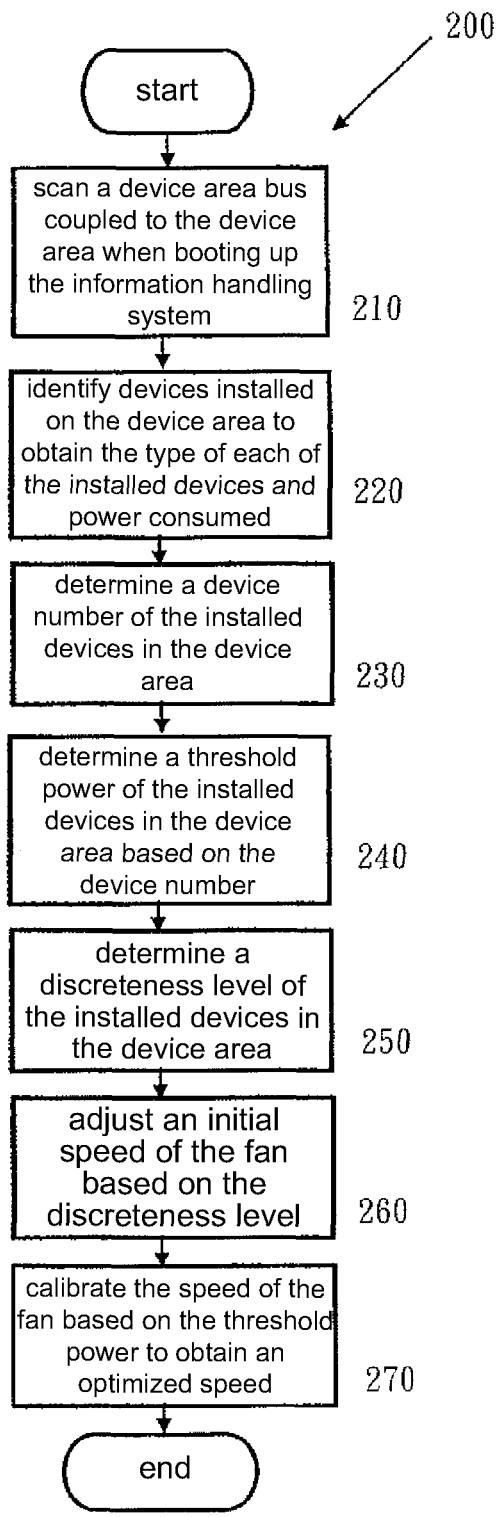
FIG. 2 is a flow chart of a method according to a specific embodiment of the present invention.
Figure 3:
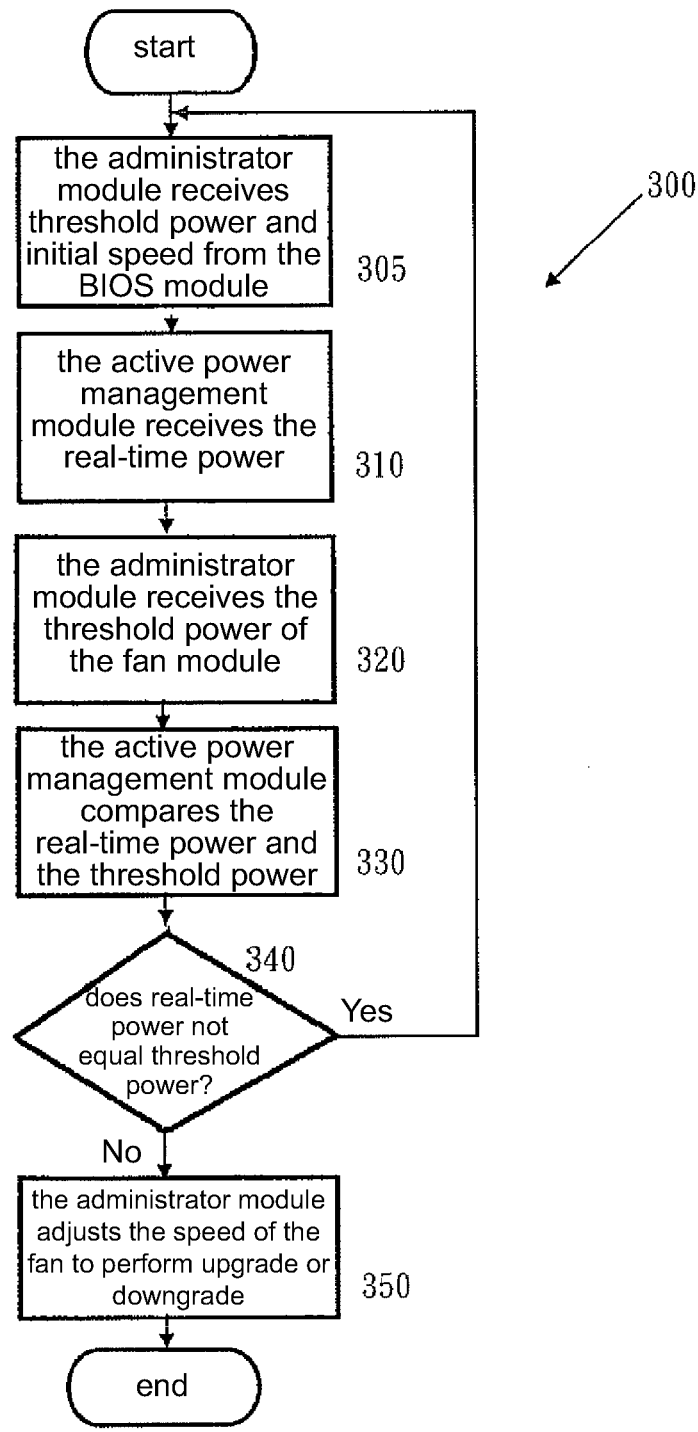
FIG. 3 is a flow chart of a method according to a specific embodiment of the present invention.

Referring now to FIG. 1 through FIG. 3, a computer device, methods, and computer program products are illustrated as structural or functional block diagrams or process flowcharts according to various embodiments of the present invention. The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Referring to FIG. 1, there is shown a schematic view of the structure of an information handling system according to a specific embodiment of the present invention. As shown in FIG. 1, a motherboard 100 is disposed in the information handling system for enabling electrical interconnection and installation of constituent elements thereof. The motherboard 100 has a processor module 104 and a system memory module 112.

The processor module 104 is, for example, a processor or a CPU. Preferably, the processor module 104 is coupled to the system memory module 112 through a memory bus 120. The system memory module 112 is, for example, a memory array that includes a memory of any appropriate type, such as DRAM or a memory device of any type.

Preferably, the processor module 104 is coupled to a bridge module 108 through a CPU bus 116. The bridge module 108 is a bridge logic device of any appropriate type, such as an I/O bridge chip. The CPU bus 116 is a bus of any appropriate type, such as a hyper transport bus or a direct media interface (DMI) bus that provides a high-speed, two-way, and point-to-point link.

A digital interconnect 134 shown in FIG. 1 may be, but is not limited to, a low pin count (LPC) bus 134. The bridge module 108 provides various bridging functions, for example, providing a means of attachment/connection, such as an interface of the LPC bus 134, or an integrated drive electronics (IDE) compatible storage device (such as a hard disk drive not shown).

An I/O controller module 138 is shown in FIG. 1. The I/O controller module 138 is coupled to the bridge module 108. The I/O controller module 138 may be, but is not limited to, a super I/O for controlling the communication between a peripheral device (such as a keyboard, a floppy disk drive, a mouse, etc.) and the bridge module 108, such that the peripheral device can communicate with the processor module 104.

A BIOS module 136 is coupled to the bridge module 108. The BIOS module 136 includes, for example, firmware internally embedded in a nonvolatile memory chip, and the BIOS module 136 includes a BIOS. To boot up the information handling system, the processor module 104 fetches program code from the BIOS module 136 on the motherboard 100. The program code in the BIOS module 136 controls the initial operation of the information handling system, including a power-on-self-test (POST), initialization, testing, etc. After the information handling system has been booted up, the control is handed over to the BIOS, thereby allowing the BIOS to check and determine whether a register and a flag of the processor module 104 is functioning well and then check and determine whether a timer and a DMA controller are functioning well. Furthermore, the BIOS initializes chipsets, memories, and registers of other peripheral devices.

The I/O controller module 138 and the BIOS module 136 are coupled to the bridge module 108 through the LPC bus 134, or through a conventional industry standard architecture (ISA) bus in another embodiment.

A device bus 124 shown in FIG. 1 may be, but is not limited to, a peripheral component interconnect (PCI) compatible bus 124. In a preferred embodiment, the PCI compatible bus 124 is, for example, a DMI bus, a PCI bus, or a PCIe (peripheral component interconnect express) bus.

The device bus 124 and a plurality of connector slots 126 corresponding in position thereto are coupled to the processor module 104. A plurality of devices 132 can be inserted into the plurality of connector slots 126, respectively. For example, the devices 132 may be, but are not limited to, PCI compatible expansion cards. In a preferred embodiment, the PCI compatible expansion cards are, for example, PCI adapter cards. In another preferred embodiment, the devices 132 may include, for example, one or more of a keyboard, a graphic indicating device, a microphone, a display device, a loudspeaker, a permanent storage device or storage device array, an optical disk drive, and a network card for connecting the information handling system and a remote user end through a network.

In a preferred embodiment, the plurality of connector slots 126 shown in FIG. 1 is exemplified by three of the connector slots 126. An area delimited by the plurality of connector slots 126 is defined as a device area 122, and for example may be, but is not limited to, a PCI card area. There are three of the connector slots 126 shown in FIG. 1 for illustrative purposes only, but the quantity of the connector slots 126 is subject to change from one system to another as needed. In another embodiment of the system, seven of the connector slots 126 lend support to the PCI compatible expansion cards 132 provided in greater quantity.

In a specific embodiment, the PCI compatible expansion cards 132 are exemplified by a network interface card (NIC), a graphic card, a redundant array of independent disks (RAID), etc. Also, in a specific embodiment, the processor module 104 of the motherboard 100 may include a plurality of CPUs each coupled to the bridge module 108 through the CPU bus 116. To effectuate the embodiments of the present invention, the PCI card area 122 may also be replaced with a memory area, a hard disk drive area, a processor area, or a target device area available in an information handling system and capable of generating heat to thereby require cooling. Similarly, the devices 132, which may otherwise come in the form of the PCI compatible expansion cards, may be replaced with a memory, a hard disk drive, a processor, or a target device available in an information handling system and capable of generating heat to thereby require cooling.

The BIOS module 136 has some low-level functions; for example, the BIOS executes the POST during a time period of starting (booting) an information handling system. A POST routine tests various sub-systems in an information handling system, isolates a failure, and reports a problem to users. The BIOS of the BIOS module 136 concurrently processes low-level I/O operations of various peripheral devices (such as a hard disk scanner, a printer, etc.). Furthermore, the BIOS is in charge of loading an operating system to a system memory of the information handling system.

The BIOS module 136 further includes a memory buffer 137. During a period of operation of the POST, the BIOS module 136 executes an operation instruction for configuring the memory buffer 137. In a specific embodiment, the memory buffer 137 is configured to include and record various data fields, such as a bus identifier, a device identifier, functions, and a flag for identifying a related status of the PCI compatible expansion cards 132.

In an embodiment, during a period of operation of the POST, the BIOS scans the PCI compatible buses 124, identifies the PCI compatible expansion cards 132 connected to the PCI compatible buses 124, and detects communication between the information handling system and the PCI compatible expansion cards 132.

FIG. 1 further shows an administrator module 182 and a device area fan module 133. The administrator module 182 is connected to the PCI card area fan module 133. The device area fan module 133 may be, but is not limited to, a PCI card area fan module.

The PCI card area fan module 133 may include a plurality of fans, such as two or four fans. The fans may be, but are not limited to, pulse width modulation fans, such that a fan speed is controlled in response to a pulse width modulation control signal. In a specific embodiment, the fan speed is a continuous monotonic function of the duty cycle of the pulse width modulation control signal and typically ranges between 100% and a specific percentage of the least revolutions per minute (RPM). Alternatively, the fans may be general DC fans.

The administrator module 182 includes a microprocessor and memory (not shown). Preferably, the administrator module 182 is a baseboard management controller (BMC) on the motherboard 100. Alternatively, the administrator module 182 is implemented in the form of a self-contained administrator module. The administrator module 182 is coupled to the bridge module 108 through a management bus 180 (such as an LPC bus) and coupled to the PCI card area fan module 133 through a fan control bus 181 for providing a control function of the PCI card area fan module 133. For example, the administrator module 182 is a Renesas 2117A BMC or an Aspeed AST2050 BMC.

Where the administrator module is a BMC, the BMC 182 is typically a microcontroller for monitoring the operation of the information handling system. In a specific embodiment, the BMC 182 monitors various operation scenarios of the information handling system, including but not limited to the temperature of components in the information handling system, the speed of a rotating component (such as a fan) in the information handling system, the voltage which is applied to or is across a component in the information handling system, and the use of a memory component in the information handling system. To achieve the aforesaid monitoring functions, the BMC 182 is coupled to all of its components (including the PCI card area fan module 133, for example) through a plurality of device buses (such as the fan control bus 181) for a control purpose. For example, in a specific embodiment, in case of an increase in the power consumed by the PCI card area, the BMC 182 increases the speed of the PCI card area fan module 133, as they are positively correlated, thereby generating a stronger air flow to enhancing cooling. The firmware of the BMC 182 preferably complies with the intelligent platform management interface (IPMI) standards for performing system surveillance.

FIG. 1 further shows an active power management module 196. In a preferred embodiment, the active power management module 196 may be, but is not limited to, the application software Active Energy Manager available from IBM. Active Energy Manager provides a single management interface for managing, monitoring, and controlling power consumption and cooling in the information handling system concurrently, so as to effectuate cross-platform power management. In other words, Active Energy Manager assists users in monitoring power consumption to ensure better configuration and better use of existing energy resources. Furthermore, Active Energy Manager enables follow-up surveillance of the actual consumption of energy resources and a thermal load related thereto in a user environment and application. Reference data regarding Active Energy Manager is available on the website http://www-03.ibm.com/systems/management/director/about/director52/extensions/actengmrg.html and the website http://www.redbooks.ibm.com/abstracts/sg247780.html.

In a specific embodiment, the active power management module 196 is configured and disposed in the system, and is coupled to the processor module 104 through a digital interconnect 199. The digital interconnect 199 may be, but is not limited to, a platform environmental control interface (PECI) bus. The PECI bus 199 enables a management engine 197 in the processor module 104 to access information from the active power management module 196. Although the PECI bus 199 is typically and mainly used in transmission of information related to thermal management, the processor module 104 can still transmit information to another controller by means of the PECI bus 199.

The management engine 197 is mainly used in storage and calculation of dynamic energy loss and consumption. In a preferred embodiment, for example, the management engine 197 applies, though the disclosure of the present invention is not limited to, a running average power limit (RAPL) to the processor module 104, such that the aforesaid mechanism enables the processor module 104 to be coupled to the active power management module 196 through the PECI bus 199 for transmission of information. Reference data regarding a management engine is available in the website http://communities.intel.com/docs/DOC-2658.

In a specific embodiment, the motherboard 100 includes various sensing devices. The sensing devices are configured based on a hardware or software component for measuring various operation-related and function-related parameters. Referring to FIG. 1, a power sensing module 192, which can be exemplified by a power sensing circuit, detects a real-time power consumed by the installed devices 132 in the PCI card area 122. The power sensing module 192 is coupled to the active power management module 196. The power sensing module 192 provides a low resistance (such as 0.001 ohm) for measuring a current I of the PCI card area fan module 133. The active power management module 196 determines the real-time power consumed by the PCI card area 132, according to the measured current I. For example, the active power management module 196 decodes and stores a current (I) and/or voltage (V) signal outputted from the power sensing module 192 and then generates a signal that denotes the real-time power.

As shown in FIG. 1, an ambient temperature sensing module 194, such as an ambient temperature sensing circuit, is coupled to the BMC 182 for detecting a temperature Te (i.e., room temperature) of an environment where the motherboard 100 operates, and the initial speed of the fan is further determined in a typical way. The ambient temperature sensing module 194 is a conventional digital thermal sensor that directly generates a digital signal corresponding to a detected ambient temperature.

In this embodiment, the active power management module 196 has an A/D port (not shown) for receiving a signal representative of the current I detected by the power sensing module 192. The administrator module 182 also has an A/D port (not shown) for receiving data from the power sensing module 192 through the active power management module 196. The administrator module 182 has a control signal output port for outputting a control signal to the PCI card area fan module 133 to control the start, shutdown, or speed of the PCI card area fan module 133. Furthermore, the administrator module 182 has another A/D port (not shown) for receiving the ambient temperature Te detected by the ambient temperature sensing module 194.

For example, in an embodiment where the PCI card area fan module 133 is a pulse width modulation fan, the administrator module 182 outputs pulse width modulation signals of different duty cycles for controlling the PCI card area fan module 133. Furthermore, a memory of the PCI card area fan module 133 can also store parameters related to the firmware required for controlling the fan and other related parameters. Techniques pertaining to controlling the PCI card area fan module 133 by means of pulse width modulation signals are well known by persons skilled in the art and thus are not described in detail herein.

For other components and basic structures of the motherboard 100 of the information handling system, please refer to general personal computers or servers, for example, the servers of IBM®, BladeCenter®, or System X® (IBM, BladeCenter, and System X are registered trademarks owned by International Business Machines Corporation). In an embodiment shown in FIG. 1, only the PCI card area fan module 133 for performing heat dissipation and the PCI card area 122 (and the PCI compatible expansion cards 132 thereon) intended for heat dissipation is shown. However, in another embodiment not shown, the processor module 104 and the system memory module 112 have their own respective fans for enhancing the efficiency of heat dissipation. Furthermore, the information handling system also includes a power supply (not shown) for supplying direct current (DC) power to the components, such as the processor module 104, the system memory module 112, and the PCI card area fan module 133. The embodiment shown in FIG. 1 is illustrated with a single fan that represents the PCI card area fan module 133; however, persons skilled in the art should understand that, in various embodiments of the present invention, it is feasible to provide fans in a quantity greater than shown.

Referring to FIG. 1 and FIG. 2, there is shown in FIG. 2 a flow chart of a fan control method 200 according to a specific embodiment of the present invention. In step 210, to start the information handling system, it is necessary to scan the PCI buses 124. In step 220, the devices 132 installed in the PCI device area 122 are identified to obtain the type and power consumption rating of each of the installed devices 132. Step 230 involves determining the number of the devices 132 installed on the PCI device area 122 (i.e., a device number). In step 240, a threshold power of the PCI device area 122 is determined by referring to a fan table stored in the BIOS module 136 based on the number of device(s), for example, as disclosed in an embodiment, in the fan table, the rated consumed power of each of the PCI devices is 25 watt, and the threshold power will equal 75 watt (25 watt×3) if it is detected that the determined number of devices is 3. For example, in another embodiment, the threshold power will equal 85 watt, if it is detected that the number of devices is determined to be 3, with one PCI device (such as a network card device) having a rated consumed power of 35 watt and the other two PCI devices having a rated consumed power of 25 watt.

In step 250, a discreteness level of the devices installed on the PCI device area 122 is determined, wherein the step of determining the discreteness level is described in detail below. In step 260, an initial speed of the fan is adjusted based on the discreteness level. In an embodiment, as described above, the initial speed is determined by the ambient temperature sensing module 194, and the step of adjusting the initial speed of the fan is described in detail below. In step 270, the speed of the fan is calibrated based on the threshold power, so as to obtain an optimized speed, wherein the step of determining an optimized speed is described in detail below.

The discreteness level of the devices 132 installed on the PCI device area 122 is determined according to the actual environment and needs. The term "discreteness level" refers to the extent to which the connector slots in the device area are populated with installed devices, such as expansion cards. When all of the connector slots are populated with an installed device, the configuration may be referred to as a continuous configuration. In a specific embodiment, after determining, in step 230, the device number N of the devices 132 that are installed in the PCI device area 122, the discreteness level is determined according to the device number N as follows:

$$\text{First discreteness level: } N \leq 1 \tag{1}$$

If there is not any installed device or the device number equals 1, then the initial speed of the fans is the lowest fan speed (LS).

$$\text{Second discreteness level: } 1 < N < (n/2)+1 \tag{2}$$

The sum of the lowest fan speed (LS) and a discrete configuration increment (A) is used as the initial speed. So, the initial speed of the fans is LS+A, where n denotes the total number of the connector slots 126.

$$\text{Third discreteness level: } (n/2)+1 \leq N \tag{3}$$

The sum of the lowest fan speed (LS) and a continuous configuration increment (M) is used as the initial speed. So, the initial speed of the fans is LS+M, where n denotes the total number of the connector slots 126.

Table 1 shows a fan table stored in, or accessible to, the administrator module 182. The values of the discrete configuration increment (A) and the continuous configuration increment (M) are determined empirically through testing and measurement. The lowest fans speed (LS) necessary to pass the thermal requirement of the PCI cards can thus be tuned from one system to another. In an embodiment where the total number of the connector slots 126 is 3, A equals 3, and M equals 5. In an embodiment where the total number of the connector slots 126 is 7, A equals 5, and M equals 7. Furthermore, the discreteness level can be determined in different ways, which is not limited by the present invention.

TABLE 1

| Device Number = 1 or 0 $N \leq 1$ | Discrete Configuration $1 < N < (n/2)+1$ | Continuous Configuration $(n/2)+1 \leq N$ |
|---|---|---|
| LS | N/A | N/A |
| LS + 1 | N/A | N/A |
| LS + 2 | N/A | N/A |
| LS + 3 | LS + A | N/A |
| LS + 4 | LS + A + 1 | N/A |
| LS + 5 | LS + A + 2 | LS + M |
| LS + 6 | LS + A + 3 | LS + M + 1 |
| : | : | : |
| : | : | : |
| N (the highest speed) | N (the highest speed) | N (the highest speed) |

Referring to FIG. 1, FIG. 2, and FIG. 3, there is shown in FIG. 3 in an exemplary manner a method 300 for calibrating the speed of a fan to obtain an optimized speed thereof according to a specific embodiment of the present invention. In step 305, the administrator module 182 receives a threshold power and an initial speed from the BIOS module 136. In a specific embodiment, the threshold power and the initial speed are obtained by the fan control method 200 of FIG. 2 and recorded in the BMC 182. In step 310, the active power management module 196 receives the real-time power of the device area 122. In a specific embodiment, the power sensing module 192 provides the real-time power of the device area 122. In step 320, the administrator module 182 receives the threshold power of the device area fan module 133. In step 330, the active power management module 196 compares the threshold power and the real-time power of the device area 122. In step 340, if it is determined that the real-time power does not equal the threshold power, the method 300 will proceed to step 350 in which the administrator module 182 adjusts the speed of the device area fan module 133. In a specific embodiment, if it is determined that the real-time power is larger than the threshold power, the administrator module 182 will make the device area fan module 133 ramp up the fan speed, and if it is determined that the real-time power is less than the threshold power, the administrator module 182 will make the device area fan module 133 ramp down the fan speed. If it is determined that the real-time power equals the threshold power, the method 300 will go back to step 350.

In the aforesaid specific embodiment, the real-time power of the device area fan module 133 is provided by the power sensing module 192. However, in another specific embodiment, the real-time power of the device area fan module 133 is obtained from the management engine 197, which is not limited by the present invention.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented fan control method for an information handling system, the information handling system comprising a device area, a fan for providing an air flow to the device area, an administrator module coupled to the fan, a processor module coupled to a device area bus, a bridge module coupled to the processor module and the administrator module, a BIOS module coupled to the bridge module, and an active power management module coupled to the administrator module, wherein the device area has a plurality of devices installed thereon, the method comprising the steps of:
    collecting thermal data of the installed devices in the device area when booting up the information handling system, wherein the collecting step includes scanning the device area bus coupled to the device area when booting up the information handling system, identifying the installed devices to obtain a type of each of the installed devices and power consumed, and determining a device number N of the installed devices;
    determining a threshold power of the installed devices in the device area and a discreteness level of the installed devices in the device area based on the thermal data;
    adjusting an initial speed of the fan based on the discreteness level; and
    calibrating the speed of the fan to obtain an optimized speed thereof based on the threshold power and the adjusted initial speed;
    wherein, after the device number N has been determined, the BIOS module determines the discreteness level of the installed devices in the device area as follows:
    when $N \leq 1$, the discreteness level is a first discreteness level wherein the initial fan speed is a lowest fan speed;
    when $1 < N < (n/2)+1$, the discreteness level is a second discreteness level wherein the initial fan speed is a sum of the lowest fan speed and a discrete configuration increment, where n denotes the total number of the connector slots in the device area; and
    when $(n/2)+1 \leq N$, the discreteness level is a third discreteness level wherein the initial fan speed is a sum of the lowest fan speed and a continuous configuration increment (M).

2. The method of claim 1, wherein the step of determining the threshold power and the discreteness level comprises:
    determining the threshold power of the installed devices based on the device number; and
    determining the discreteness level of the installed devices based on configuration of installation of the installed devices in the device area.

3. The method of claim 1, wherein the BIOS module comprises a firmware internally embedded in a nonvolatile memory chip, and the BIOS module includes a BIOS, for performing the collecting step and the step of determining the threshold power and the discreteness level.

4. The method of claim 3, wherein the administrator module comprises a baseboard management controller for monitoring an operation of the information handling system and performing the step of adjusting the initial speed and the step of calibrating the initial speed, and/or the active power management module comprises an active power management application software for performing active management, monitoring, and control on power consumption and cooling in the information handling system.

5. The method of claim 4, wherein the information handling system further comprises a power sensor coupled to the active power management module, and the calibrating step comprises the sub-steps of:
    receiving a real-time power by the active power management module;
    receiving the threshold power of the fan module by the administrator module;
    comparing the real-time power and the threshold power by the active power management module;
    the administrator module ramping down or ramping up a speed of the fan in response to determining that the real-time power does not equal the threshold power; and
    repeating the above sub-steps if the real-time power equals the threshold power.

6. The method of claim 1, wherein the device area bus and a plurality of connector slots corresponding in position thereto are coupled to the processor module, and a plurality of devices can be inserted into the plurality of connector slots, respectively, wherein the information handling system further comprises an ambient temperature sensing module for detecting a temperature of an environment for operation of the information handling system and determining the initial speed of the fan.

7. A fan control apparatus for an information handling system, the information handling system comprising a device area, a fan for providing an air flow to the device area, a processor module coupled between the device area and a BIOS module, a bridge module coupled between the processor module and an administrator module and coupled between the processor module and the BIOS module, an active power management module coupled to the administrator module, and an ambient temperature sensing module for detecting a temperature of an environment for operation of the information handling system and determining the initial speed of the fan, wherein a device area bus and a plurality of connector slots corresponding in position thereto are coupled to the processor module, and a plurality of devices can be inserted into the plurality of connector slots, respectively, and wherein the device area has a plurality of devices installed thereon, the apparatus comprising:

- the BIOS module, coupled to the device area, provided for:
  - collecting thermal data of the installed devices in the device area when booting up the information handling system, wherein the collecting step includes scanning a device area bus coupled to the device area when booting up the information handling system, identifying the installed devices to obtain a type of each of the installed devices and power consumed, and determining a device number N of the installed devices; and
  - determining a threshold power of the installed devices in the device area and a discreteness level of the installed devices in the device area based on the thermal data; and
- the administrator module, coupled to the fan and the BIOS module, provided for:
  - adjusting an initial speed of the fan based on the discreteness level; and
  - calibrating the speed of the fan based on the threshold power and the adjusted initial speed to obtain an optimized speed;
- wherein, after the device number N has been determined, the BIOS module determines the discreteness level of the installed devices in the device area as follows:
- when $N \leq 1$, the discreteness level is a first discreteness level wherein the initial fan speed is a lowest fan speed;
- when $1 < N < (n/2)+1$, the discreteness level is a second discreteness level wherein the initial fan speed is a sum of the lowest fan speed and a discrete configuration increment, where n denotes the total number of the connector slots in the device area; and
- when $(n/2)+1 \leq N$, the discreteness level is a third discreteness level wherein the initial fan speed is a sum of the lowest fan speed and a continuous configuration increment (M).

8. The apparatus of claim 7, wherein the step of determining the threshold power and the discreteness level comprises:
- determining the threshold power of the installed devices based on the device number; and
- determining the discreteness level of the installed devices based on configuration of installation of the installed devices in the device area.

9. The apparatus of claim 7, wherein the BIOS module comprises a firmware internally embedded in a nonvolatile memory chip, and the BIOS module includes a BIOS, for performing the collecting step and the step of determining the threshold power and the discreteness level.

10. The apparatus of claim 9, wherein the administrator module comprises a baseboard management controller for monitoring an operation of the information handling system and performing the step of adjusting the initial speed and the step of calibrating the initial speed, and/or the active power management module comprises an active power management application software for performing active management, monitoring, and control on power consumption and cooling in the information handling system.

11. The apparatus of claim 10, wherein the information handling system further comprises a power sensor coupled to the active power management module, for:
- receiving a real-time power by the active power management module;
- receiving the threshold power of the fan module by the administrator module;
- comparing the real-time power and the threshold power by the active power management module;
- the administrator module ramping up or ramping down a speed of the fan in response to determining that the real-time power does not equal the threshold power; and
- repeating the above sub-steps if the real-time power equals the threshold power.

* * * * *